United States Patent
Canu-Chiesa et al.

(10) Patent No.: US 7,747,360 B2
(45) Date of Patent: Jun. 29, 2010

(54) AIRCRAFT COCKPIT DISPLAY DEVICE FOR INFORMATION CONCERNING SURROUNDING TRAFFIC

(75) Inventors: Simona Canu-Chiesa, Lavaur (FR); Guillaume Fouet, Toulouse (FR)

(73) Assignee: Airbus France, Toulouse (FR)

( * ) Notice: Subject to any disclaimer, the term of this patent is extended or adjusted under 35 U.S.C. 154(b) by 883 days.

(21) Appl. No.: 10/833,069

(22) Filed: Apr. 28, 2004

(65) Prior Publication Data
US 2006/0265109 A1 Nov. 23, 2006

(30) Foreign Application Priority Data
Apr. 28, 2003 (FR) .................................. 03 05147

(51) Int. Cl.
*G01S 13/93* (2006.01)
(52) U.S. Cl. .................. 701/3; 342/29; 342/357.08; 340/902; 340/961; 340/945
(58) Field of Classification Search ............... 701/3, 701/14, 207, 214; 342/29, 36, 455, 26, 30, 342/357.08; 244/175; 340/945, 947, 902, 340/961; 715/700; *G01S 13/93*
See application file for complete search history.

(56) References Cited

U.S. PATENT DOCUMENTS

| | | | | | |
|---|---|---|---|---|---|
| 4,978,945 | A | * | 12/1990 | Funatsu | 340/961 |
| 5,077,673 | A | * | 12/1991 | Brodegard et al. | 701/301 |
| 5,111,400 | A | * | 5/1992 | Yoder | 701/3 |
| 5,179,377 | A | * | 1/1993 | Hancock | 340/961 |
| 5,596,332 | A | * | 1/1997 | Coles et al. | 342/455 |
| 6,252,525 | B1 | * | 6/2001 | Philiben | 340/961 |
| 6,345,232 | B1 | * | 2/2002 | Lynch et al. | 701/214 |
| 6,366,836 | B1 | * | 4/2002 | Johnson | 701/4 |
| 6,389,355 | B1 | * | 5/2002 | Gibbs et al. | 701/206 |
| 6,496,760 | B1 | * | 12/2002 | Michaelson et al. | 701/3 |
| 6,683,541 | B2 | | 1/2004 | Staggs et al. | |
| 6,711,479 | B1 | * | 3/2004 | Staggs | 701/16 |
| 6,906,641 | B2 | * | 6/2005 | Ishihara | 340/946 |
| 7,408,552 | B2 | * | 8/2008 | Kellman et al. | 345/440 |
| 2001/0044680 | A1 | * | 11/2001 | Lemelson et al. | 701/3 |
| 2001/0052562 | A1 | * | 12/2001 | Ishihara et al. | 244/175 |
| 2002/0011950 | A1 | * | 1/2002 | Frazier et al. | 342/357.08 |
| 2002/0075171 | A1 | * | 6/2002 | Kuntman et al. | 340/961 |
| 2002/0089432 | A1 | * | 7/2002 | Staggs et al. | 340/945 |
| 2002/0111740 | A1 | * | 8/2002 | Horvath et al. | 701/302 |
| 2002/0154061 | A1 | * | 10/2002 | Frazier et al. | 342/455 |

(Continued)

FOREIGN PATENT DOCUMENTS

EP 1179725 2/2002

(Continued)

*Primary Examiner*—Tuan C To
(74) *Attorney, Agent, or Firm*—Oblon, Spivak, McClelland, Maier & Neustadt, L.L.P.

(57) ABSTRACT

An aircraft cockpit display device for information concerning surrounding traffic includes devices to receive information coming from outside the aircraft, to know the flight parameters of the aircraft, to calculate projected trajectories of the aircraft and of a detected aircraft in the immediate vicinity, and to display a representation of the surrounding traffic through symbols and potential messages based on instructions received. A display command device is connected to an on-board calculator to know the flight phase of the aircraft. The display command device has a filtering device to define for each flight phase and/or crew task the nature and the level of information to be displayed.

47 Claims, 12 Drawing Sheets

U.S. PATENT DOCUMENTS

| | | |
|---|---|---|
| 2002/0188398 A1* | 12/2002 | Watson .................... 701/120 |
| 2003/0107499 A1* | 6/2003 | Lepere et al. ............. 340/945 |
| 2003/0122701 A1* | 7/2003 | Tran ......................... 342/29 |
| 2003/0137444 A1* | 7/2003 | Stone et al. ................ 342/30 |
| 2003/0187552 A1* | 10/2003 | Lehman et al. ............. 701/3 |
| 2004/0046712 A1* | 3/2004 | Naimer et al. ............... 345/9 |
| 2004/0181318 A1* | 9/2004 | Redmond et al. ........... 701/9 |

FOREIGN PATENT DOCUMENTS

| | | |
|---|---|---|
| WO | WO 02 39058 | 5/2002 |

* cited by examiner

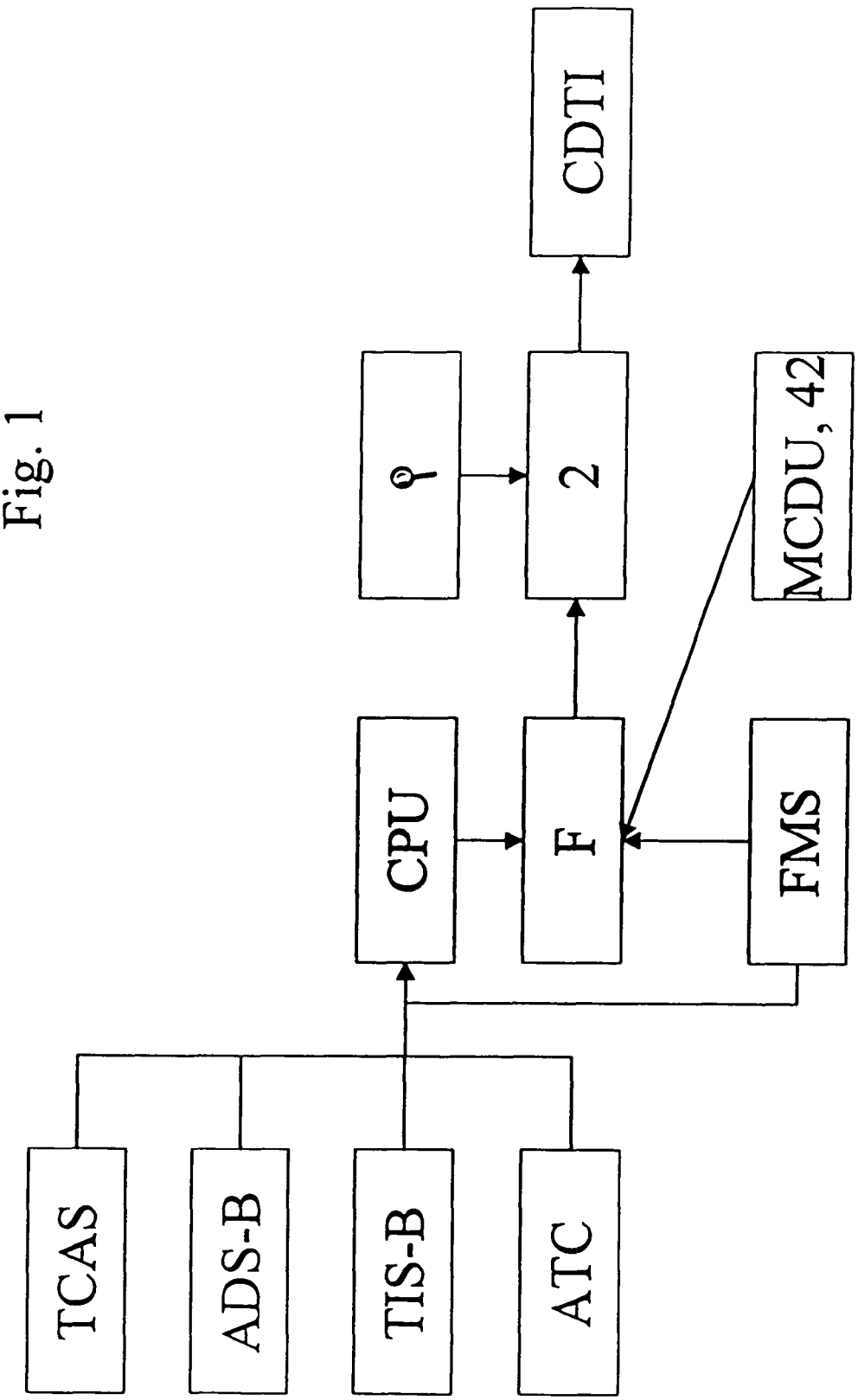

AIRCRAFT COCKPIT DISPLAY DEVICE FOR INFORMATION CONCERNING SURROUNDING TRAFFIC

CROSS-REFERENCE TO RELATED APPLICATIONS

This application claims priority to French Application No. 03 05147, filed Apr. 28, 2003 the entire content of which is hereby incorporated by reference.

BACKGROUND OF THE INVENTION

1. Field of the Invention

This invention concerns an aircraft cockpit display device for information concerning surrounding traffic.

2. Discussion of the Background

In planes of a certain size and/or capable of transporting a preset number of passengers, the pilot has a device to help avoid collisions with other planes. This type of device is known as TCAS for "Traffic Alert and Collision Avoidance Systems," which is therefore a system for air traffic collision alert and avoidance. This system makes it possible to monitor the air space close to the plane in question using radar. A display system makes it possible to display the surrounding aircraft detected by the system. In case of any risk of collision, the TCAS system issues alerts that are classified into two levels depending on the imminence of the risk of collision. Additionally, it establishes communication between the aircraft that are at risk of colliding with one another and suggests a maneuver suited to each of their situations. The system then gives each pilot instructions; for example, it orders one of the planes to ascend and the other to descend. The indications displayed on the screen corresponding to the TCAS are relatively abbreviated. Geometric shapes (lozenge, circle and square) are used depending on the proximity of the other plane and the imminence of the risk of collision.

Another system called ADS-B for "Automatic Dependent Surveillance-Broadcast" has been developed but is not yet in service. This system makes it possible to provide information concerning air space monitoring in an expanded space often exceeding 100 miles (1 mile=1,852 m). The information provided by the ADS-B is used to show the surrounding traffic on a display device. This makes it possible to give the crew a better understanding of the surrounding traffic. In the ADS-B system, each aircraft so equipped transmits information concerning its position, its speed, its direction, etc. This information may be received by air surveillance radar and also by planes equipped to receive and interpret the information transmitted.

Several applications are envisioned with an ADS-B system. The information collected by an ADS-B system can be used to supply a pilot with the position of surrounding aircraft by means of a display screen called CDTI for "Cockpit Display of Traffic Information." This type of display can already be found in any airplane cockpit equipped with a TCAS. Thus, a first application allows the crew to better locate another airplane, for example under particular meteorological conditions. Another application is to make it possible to improve a visual approach by identifying the aircraft seen by the crew and providing it with information related to this aircraft. When the aircraft is on the ground, the system can also be used to indicate to the crew the situation of its own aircraft at the airport and also to provide information concerning the other aircraft surrounding its own aircraft. Before landing, during final approach, an ADS-B system also makes it possible to alert the pilot if the runway is occupied, for example. This type of system can also be used to help the pilot keep his distance from an aircraft preceding him both during flight phases and landing and takeoff.

There is also another system called TIS-B for "Traffic Information System-Broadcast." The principle here consists in transmitting information developed by ground control. Thus, the planes benefit from information in the possession of ground control. This system allows wider coverage than the coverage obtained with ADS-B systems. However, the accuracy with a system using TIS-B can be different than that obtained with ADS-B. This can be explained more particularly by the delay necessary to retransmit the information received to the ground.

SUMMARY OF THE INVENTION

This invention thus aims to supply information, based on information received in the aircraft by various on-board systems (TCAS, ADS-B, TIS-B, etc.) or other systems to the crew to give the crew the best knowledge possible concerning its environment so that they can pilot their aircraft safely and avoid any aircraft whose trajectory risks crossing their own.

To this end, it proposes an aircraft cockpit display device for information concerning the surrounding traffic comprising means for receiving information coming from outside the aircraft, means making it possible to know the aircraft's flight parameters, calculation means making it possible to calculate the relative speeds and positions of the aircraft and of the aircraft detected in the immediate vicinity, means for controlling the display and display means for displaying a representation of the surrounding traffic through symbols and potential messages based on instructions received by the display command means.

According to this invention, the display command means are connected to an on-board calculator in order to know the aircraft's flight phase, and the display command means have filtering means defining, for each flight phase and/or crew task, the nature and the level of information to be supplied to the display means.

In this way, automatically, based on the flight phase or even based on the tasks it is the process of performing, the crew has all the information it need without excess information, so that only useful information is displayed on the display means.

The display command means preferably also comprise means making it possible to modify the display based on special information of a pre-determined type received by the external information receiving means. This involves, for example, an authorization given by air traffic control to execute various phases of a flight, authorization also known as clearance.

The display command means are advantageously connected to the means for communicating with a crewmember. Thus, it is possible to request more information than the information mentioned or even to request other information. These means of communication comprise, for example, a control keyboard or even a manual selector to select a symbol displayed on the display means. Information is thus, for example, automatically displayed with the selected aircraft.

The display command means advantageously comprise means for adjusting the scale used for the display. Thus, the members of the crew can select the space around their aircraft they wish to observe. These scale adjustment means comprise a manual selector, for example.

To avoid representing the same aircraft identified by two different means (for example ADS-B and TCAS) twice on the display means, the filtering means advantageously comprise means of comparison making it possible to recognize whether or not two distinct bits of information coming from distinct information sources correspond to the same detected aircraft.

In the display device according to the invention, means are preferably provided to recognize the source of information received from the outside, making it possible to recognize that the distinct bits of information coming from distinct sources of information correspond to the same detected aircraft. The display means thus advantageously display a different aircraft symbol depending on the information source that made it possible to detect said aircraft, said symbol being stored in a memory associated with the display means. The user of the display device then knows the source of the information immediately. He can thus know how reliable this information is. Thus, for example, if a position is given by the TIS-B system, the user knows that this position is less precise than if it is given by an ADS-B system.

In this case, when the means for receiving outside information comprise a TCAS, the symbol of an aircraft located by the TCAS is advantageously represented by a lozenge or a circle or a square, as is usually the case with this type of system. Therefore pilots do not need to change their habits. However, this invention proposes in original manner that the lozenge be colored white, the circle orange and the square red.

When the means for receiving information from the outside comprise an ADS-B system, the symbol of an aircraft detected by the ADS-B system advantageously takes the form of a longitudinal bar symbolizing the fuselage of the detected aircraft, a large transversal bar symbolizing its wings and a small transversal bar symbolizing its tail assembly. In this case, the longitudinal bar of the symbol representing the aircraft detected is advantageously oriented so as to indicate the relative direction of movement of this aircraft compared to its own aircraft while the relative position of the transversal bars gives the orbital direction.

When the means for receiving information from the outside comprise a TIS-B system, the symbol of an aircraft detected by the TIS-B system appears, for example, in the shape of a longitudinal bar symbolizing the fuselage of the detected aircraft and a V centered on the bars symbolizing the fuselage and the wings of the aircraft. In this case, the longitudinal bar of the symbol representing the aircraft detected and the V are advantageously oriented in order to indicate the relative orbital direction of this aircraft compared to its own aircraft.

When the different sources (ADS-B/TIS-B/TCAS) making it possible to locate an aircraft are correlated, to avoid representing the same aircraft with several symbols, the display means display a single aircraft symbol corresponding to the integration of the symbols corresponding to the sources concerned.

In practice, with the preferred forms of embodiment described above, when the means for receiving information from the outside comprise an ADS-B system as well as a TCAS, then the symbol representing an aircraft detected both by the ADS-B system and the TCAS preferably takes the form of a longitudinal bar symbolizing the fuselage of the detected aircraft, a large transversal bar symbolizing its wings and a small transversal bar symbolizing its tail assembly superimposed on the representation symbol provided by the TCAS, namely a lozenge, circle or square, this symbol being located, for example, at the intersection of the bar representing the fuselage and the bar representing the wings.

Similarly, in the case of a TIS-B system used with a TCAS, the symbol for representing an aircraft detected both by the TIS-B system and the TCAS preferably takes the form of a longitudinal bar symbolizing the fuselage of the detected aircraft, a V centered on the bar symbolizing the fuselage and symbolizing the wings of the aircraft and a small transversal bar symbolizing its tail assembly superimposed on the representation symbol provided by the TCAS, namely a lozenge, circle or square, this symbol being located preferably at the intersection of the bar representing the fuselage and the bar representing the wings.

If the means for receiving information from the outside have information coming from an ADS-B system, from a TIS-B system (since the TIS-B could be less accurate than the ADS-B) and the TCAS for a same aircraft, then the symbol for representing the detected aircraft preferably takes the form of a longitudinal bar symbolizing the fuselage of the detected aircraft, a large transversal bar symbolizing its wings and a small transversal bar symbolizing its tail assembly superimposed on the representation symbol provided by the TCAS, namely, a lozenge, circle or square located at the intersection of the bar representing the wings.

Based on the flight phases, the symbol used to represent a detected aircraft can potentially be associated with an arrow or similar figure whose length is representative of the rate of approach of said aircraft (othership) compared to the aircraft itself (ownship). This symbol representative of the speed is displayed based on the algorithm governing the filtering means of a display device according to the invention.

In the display device according to the invention, based on the flight phases, a predetermined symbol stored in a memory associated with the display means is advantageously displayed by display means for representing a landing strip. The color of the symbol corresponding to a landing strip displayed varies preferably based on the presence or absence of another aircraft on said landing strip, as well as on the risks run by the ownship in landing on said landing strip based on predetermined criteria stored in a memory associated with the display command means.

The display means of a device according to the invention also, for example, display pre-defined symbols stored in a memory associated with the display means to represent a detected aircraft, as well as information in alphanumeric form alongside at least one symbol displayed by the display means. The information in alphanumeric form positioned alongside a symbol corresponding to a detected aircraft is then preferably based on the flight phase and/or the distance separating the detected aircraft from the ownship and/or the speed of the detected aircraft and or the orbital direction of this aircraft, in accordance with the algorithm governing the filtering means.

The ownship can also be symbolized on the display means. Preferably a specific color, yellow, for example, is used for ownship representation so that it cannot be confused on the screen with a detected aircraft.

BRIEF DESCRIPTION OF THE DRAWINGS

Details and advantages of this invention will become clearer from the following description given in reference to the appended schematic drawing in which:

FIG. 1 is a schematic view of a display device according to the invention in its environment.

DESCRIPTION OF THE PREFERRED EMBODIMENTS

Figure 2A:
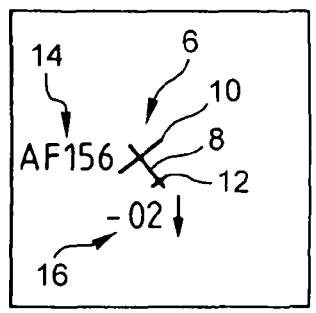
FIGS. 2A through 2N and FIGS. 2P through 2R are examples of displays on a screen located in an aircraft cockpit associated with this invention.

The description that follows is given in reference to airplanes, however this invention can also apply to any type of aircraft, for example, helicopters.

FIG. 1 is a schematic representation of a display device according to the invention, this device being represented in its environment.

In the cockpit of a plane equipped with a device according to the invention, the visible part of the device is a screen of the type know to the person with ordinary skill in the art and corresponds, for example, to a display screen used with a TCAS (for "Traffic Alert and Collision Avoidance System"). This type of display screen is commonly called CDTI for "Cockpit Display of Traffic Information." It is sometimes possible here to use a heads-up sight or any other display means.

This screen or CDTI is managed by display command means 2. These are electronic means that take the form of a video card with an integrated memory, for example.

These display command means 2 receive instructions from a calculator and also have interfaces allowing the crew to make adjustments. We have symbolized these interfaces here by a magnifier representing, by way of example, a lever making it possible to modify the scale on the display screen.

The information received by the display command means 2 can come from various sources. Certain possible sources are represented in FIG. 1. This figure is not exhaustive, and the device according to the invention also functions when the corresponding airplane is not equipped with all the systems that will be mentioned hereinbelow. Thus, the information the airplane receives can come from a TCAS. The European and American standards require the presence of this type of system on airplanes of a certain size and/or capable of transporting a pre-set number of passengers.

The airplane in question can also be equipped with an ADS-B and/or TIS-B system, these systems being presented in the Discussion of the Background section of this document. An airplane can also receive information in numerical form from air traffic control or ATC based on the ground.

All the sources of information cited above are sources outside the airplane. They provide information concerning the presence of another airplane in relative proximity with the ownship. Depending on the technology used, the information is more or less precise and more or less complete, each source having its specificities. Information received by the display command means 2 also comes from information sources inside the airplane. This particularly concerns information obtained by the navigation unit and a GPS or "Global Positioning System" equipping all modern airplanes. This GPS system is generally integrated in a Flight Management System of FMS.

All this information is processed by a calculator called CPU for "Central Processing Unit" here. This involves one (or more) calculator(s) that, based on the data received, determine(s) the trajectory of its own airplane and of the airplanes detected by the external sources of information (TCAS, ADS-B, TIS-B, etc.). It also calculates the relative position and speed of detected airplanes with respect to its own airplane.

The data thus processed are filtered by a filter symbolized in FIG. 1 by the letter F. This filter filters the data it receives differently depending on the flight phase of the airplane. These flight phases are indicated by the flight management system FMS. The data thus filtered are then sent to the display command means 2. The different flight phases known in the FMS are, for example, as follows: flight preparation, takeoff, ascent, cruising speed, descent, approach, overshoot and end of flight. During these flight phases, the crew must perform different tasks that will be mentioned later depending on the situations encountered.

The crew may also act on the filtering performed by the filter F. It may, for example, use a device known to the person with ordinary skill in the art for this purpose, since it is already used onboard airplanes. This is an alphanumerical keyboard generally also known as the MCDU for "Multi-Function Control and Display Unit." It can also act through the intermediary of an interface 4 like the one represented in FIG. 3 and described in more detail in the rest of this description.

FIGS. 2A through 2N and 2P through 2R give examples of displays on the CDTI screen of a device according to the invention.

In FIG. 2A, we have represented an airplane detected thanks to the ADS-B system. The symbol 6 used to represent this airplane includes a longitudinal bar 8 symbolizing the fuselage of the detected airplane, a transversal bar 10 symbolizing the wings of the detected airplane and a transversal bar 12 also symbolizing the tail assembly of the detected airplane. The orientation of the longitudinal bar 8 indicates the direction of movement of the detected airplane and the relative position of the transversal bars 10 and 12 (the transversal bar 12 being shorter than the transversal bar 10) indicate the orbital direction of this airplane. An alphanumerical field or ID code 14 makes it possible to identify the airplane represented by the symbol 6. Another field 16 gives information concerning the relative movement between the ownship and the detected airplane represented by the corresponding symbol 6. In this field 16 we use the same conventions as those used for the displays of TCAS systems.

Figure 2B:
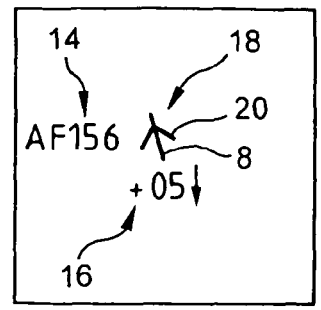

FIG. 2B shows an example of a symbol for representing an airplane detected by a TIS-B system. The symbol 18 used here repeats the transversal bar 8 symbolizing the fuselage of the detected airplane. The wings are symbolized by a broken line forming a V 20 symbolizing the wings of the detected airplane. This V 20 is centered on the longitudinal bar 8 that thus forms the bisector of the angle formed by the two branches of the V 20. Just as for the symbol 6, here, the longitudinal bar 8 gives the direction of movement of the airplane detected and represented by the symbol 18, while the orbital direction is indicated by the point of the V 20. In this display example, we once again find the ID code 14 and the field 16 of FIG. 2A.

Figure 2C:
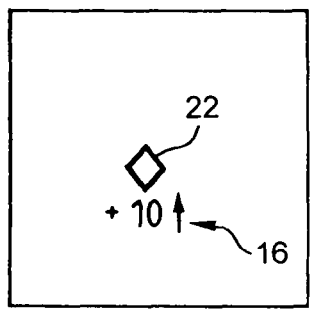

FIGS. 2C through 2F represent known symbols, since these are symbols used in existing TCAS systems. In FIG. 2C an othership distant from the ownship is symbolized by the periphery of a lozenge 22. A field 16 giving information concerning the relative movement of the airplane symbolized by the lozenge periphery 22 compared to the ownship is associated with this lozenge periphery 22 in standard fashion.

Figure 2D:
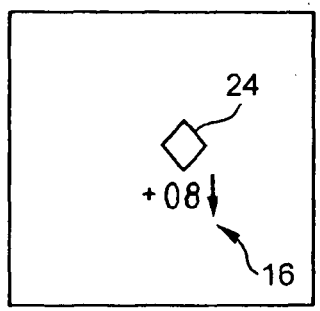

In FIG. 2D, we have represented a display example of an airplane detected solely by the TCAS, this airplane being located close to the ownship. The symbol used is then a full lozenge 24 and it is associated with a field 16 like the one in FIGS. 2A through 2C.

Figure 2E:
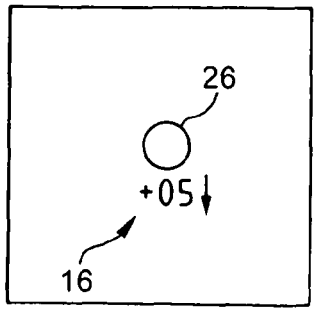

In FIG. 2E, the plane detected is represented by a circle 26. This corresponds to a first alert from the TCAS called TA for "Traffic Advisory." This circle 26 is associated in standard fashion with a field 16. Here we propose associating this circle with the color orange. Thus, the shape and color codes conventionally used by a TCAS are repeated here.

Figure 2F:
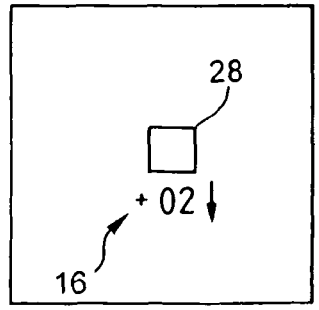

In FIG. 2F, the plane detected has been detected only by the TCAS. This system announces a resolution advisory RA and symbolizes the corresponding airplane by a square 28. In standard fashion, a field 16 is associated with this square 28.

Here we propose coloring this square red to better attract the attention of the crew to this detected airplane with which there is a risk of collision.

Figure 2G:
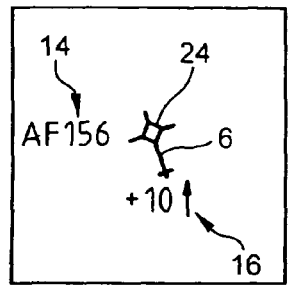
Figure 2H:
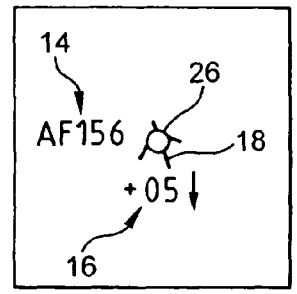

FIGS. 2G and 2H each show an example of a symbol when an airplane is detected by two distinct sources of information. In FIG. 2G, the airplane detected was detected by the TCAS and by an ADS-B system. The symbol used to represent this airplane is the superimposition of a lozenge 24 corresponding to the symbol that would be used if the airplane had been detected by the TCAS alone and a symbol 6 used to represent an airplane detected solely by an ADS-B system. With this symbol corresponding to the superimposition of the symbols 6 and 24, are associated the ID code 14 supplied by the ADS-B and the field 16 common to the ADS-B and the TCAS. The logic in FIG. 2H is the same: the detected airplane is symbolized by the superimposition of a circle 26 and the symbol 18 corresponding to the TIS-B system. Here, again, we use the colors defined previously. Thus, in FIG. 2G, the symbol will repeat the color of a TCAS lozenge, white, for example, while the symbol of FIG. 2H will be orange.

Figure 2I:
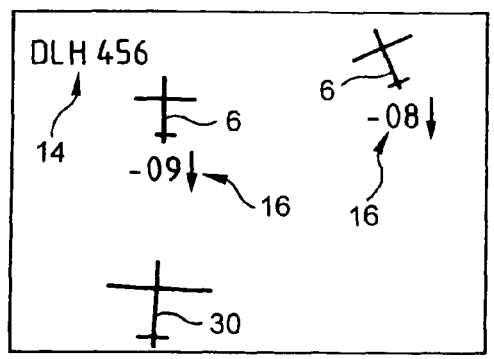
Figure 2J:
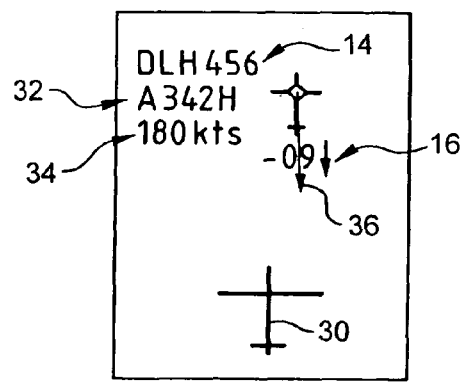
Figure 2K:
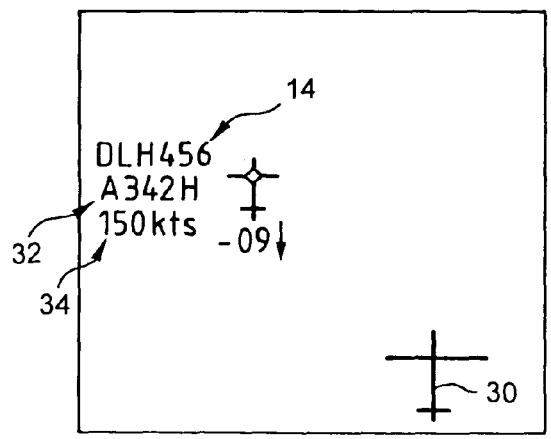

In FIGS. 2I through 2K, we have represented a display example when the airplane is in flight. In FIG. 2I, we again find two symbols 6 corresponding to two airplanes detected thanks to an ADS-B system. For one of these airplanes, the ID code 14 is known and for the two airplanes, the field 16 is filled in. In these three figures, we have represented the ownship with a symbol 30. Here, for example, we use the symbol used to represent an airplane detected by an ADS-B system. To clearly distinguish the airplane on the CDTI, we give it a particular color, yellow, for example.

In FIG. 2J, the airplane represented was detected by the TCAS and an ADS-B system. We indicate on the display screen CDTI the ID code 14 and the field 16 corresponding to this detected airplane. Additional information is given. Thus, we indicate, for example, the type 32 of airplane. We use the customary acronyms used to indicate the type of airplane. In the example given, this is an AIRBUS 340-200. The letter H relates to the category of wake vortex generated by this type of craft. A speed 34 expresses the speed compared to the air (Indicated Air Speed) of the detected plane. To complete the information to the extent possible, an arrow 36 gives indications concerning the approach rate between the ownship and the detected airplane. We note in FIG. 2K that the arrow 36 does not appear. Here we are in a roughly identical flight phase, but the filtering means of the device according to the invention make it possible to avoid giving too much information when this information is not necessary for piloting the airplane.

Figure 2L:
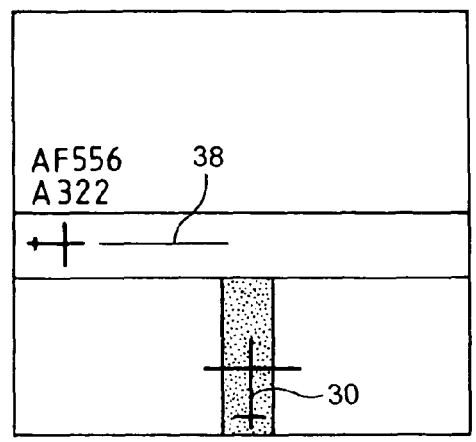

In FIG. 2L, the airplane is on the ground, and we represent on the CDTI the map of the airport with the runways and taxiways plan depending on the scale used. First of all we represent the runway on which the ownship is located (symbol 30), as well as the taxiway on which a detected plane is located. We can also symbolize the speed vector that indicates the ground speed of the detected airplane by a line 38.

Figure 2M:
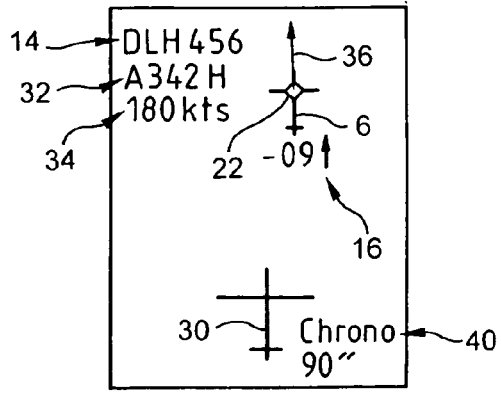

In FIG. 2M, we have also represented a chronometer 40 that indicates, based on the speeds of each of the airplanes, the time that separates these two airplanes.

Figure 2N:
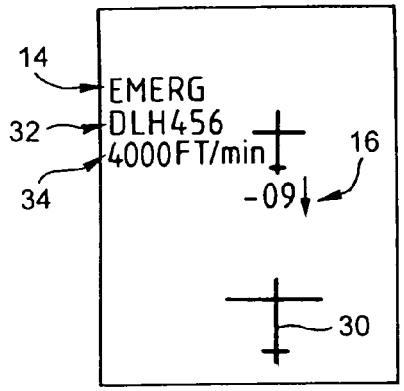

In FIG. 2N, we have represented an emergency situation. The abbreviation EMERG then appears in red on the CDTI alongside the indications concerning the detected plane that is in an emergency situation.

The system represented in FIG. 1 preferably comprises means making it possible to associate the corresponding information source with external information. In this manner, the display command means 2 know which symbol must be used to represent an airplane identified on the CDTI. The airplane's crew then knows immediately where this information comes from. It can also know the integrity and the accuracy of this information.

To avoid having the same plane identified by two distinct information sources appear two (or more) times on the CDTI, the system of FIG. 1 advantageously incorporates, for example in the filter F, means for comparing the information received making it possible to recognize whether nor not distinct bits of information coming from distinct information sources correspond to the same detected airplane.

Figure 3:
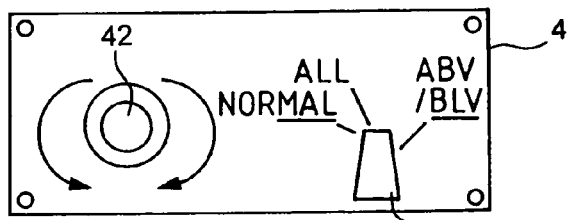
FIG. 3 represents control means for acting on the display.

In FIG. 3, we have represented a mode of embodiment of the interface 4 mentioned earlier. This interface is shown here in the form of a turn button 42 and a button 44. This button is a TCAS control feature that makes it possible to select vertical display volumes. For example, if the NORMAL mode is selected, we will display the traffic located in the vertical segment included between +/−2,700 feet (or around +/−820 m). The turn button 42 is, for example, activated when it is pushed in and is deactivated when it is pulled toward the user. The turn button 42 makes it possible to select on the display screen CDTI the symbol corresponding to the airplane detected for which more information is desired. Once this symbol is selected, the filtering means determine the information to be displayed.

By turning the turn button 42, the planes displayed are identified one after the other on the display screen, appearing in 3D or even having a particular color or are even circled . . . The order of selection can follow different logics. In a first case, we can, for example, perform an azimuthal scan of the screen. In a second case, we can choose to select the planes based on the distance separating them from the ownship. Other logics can also be chosen.

Figure 2P:
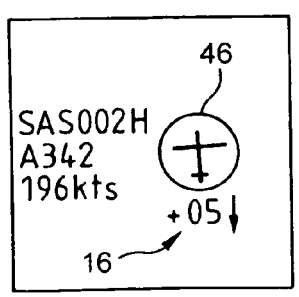
Figure 2Q:
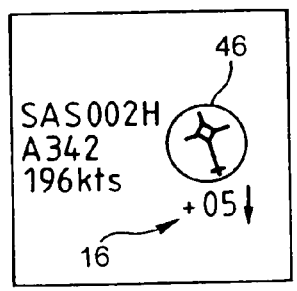
Figure 2R:
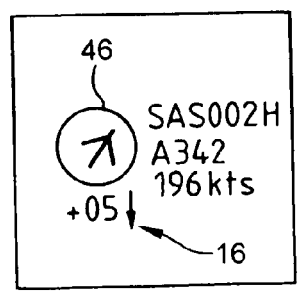

FIGS. 2P through 2R show display examples on the CDTI when a symbol has been selected using the turn button 42. This symbol then appears surrounded by a circle 46. The FIG. 2P corresponds to an airplane detected using only the ADS-B system; FIG. 2Q corresponds to an airplane detected by the TCAS and an ADS-B system and potentially also a TIS-B system. In FIG. 2R, the airplane represented was detected solely with a device using the TIS-B technology.

The device according to the invention represented schematically in FIG. 1, allows a crew to get additional information (with respect to the existing devices) concerning the surrounding traffic and to represent this information with displays corresponding, for example, to FIGS. 2A through 2N and 2P through 2R, depending on the different flight phases, the workload and the needs tied to the piloting tasks through ten applications described hereinbelow. Thus, the surrounding traffic can be represented in all the flight phases and the information necessary for managing the flight operations is made available. Filtering algorithms integrated in the filter make it possible to manage the displayed information automatically.

The system represented in FIG. 1 can provide that a standard label is always associated with the traffic revealed on the CDTI.

On the other hand, if a member of the crew chooses an application, the label will conform to the information related to the application chosen.

The content of the standard labels is, for example, as follows:

Airplane identifier,
Airplane type,
Wake Vortex Category: L, M, H
IAS (Indicated Air Speed) calculated in knots or Mach number.

Depending on the orientation of the airplane symbol, the labels are displayed to the left or right of the airplane symbols. If the airplane's heading is between 0° and 179°, the label will be displayed on the left side with right justification, and if the airplane heading is between 180° and 359°, the label will be displayed on the right side of the symbol with left justification.

The traffic information in label form is displayed either:

manually via the turn button 42 and/or through interactive pages (for example through the MCDU) in standard label form, following the automatic activation of an application. In this case, the content of the label will be tied to the application in progress and consistent with the flight phase.

following automatic loadings of ATC clearances transmitted via a data link called Control-Pilot Data Link of CPDLC. Even in this case, the content of the label will be tied to the application in progress and will be consistent with the flight phase.

Examples of algorithms are given below in reference to certain applications.

"In-flight Collision Avoidance Assistance or Support for the 'See and Avoid' Procedure."

Figure 4:
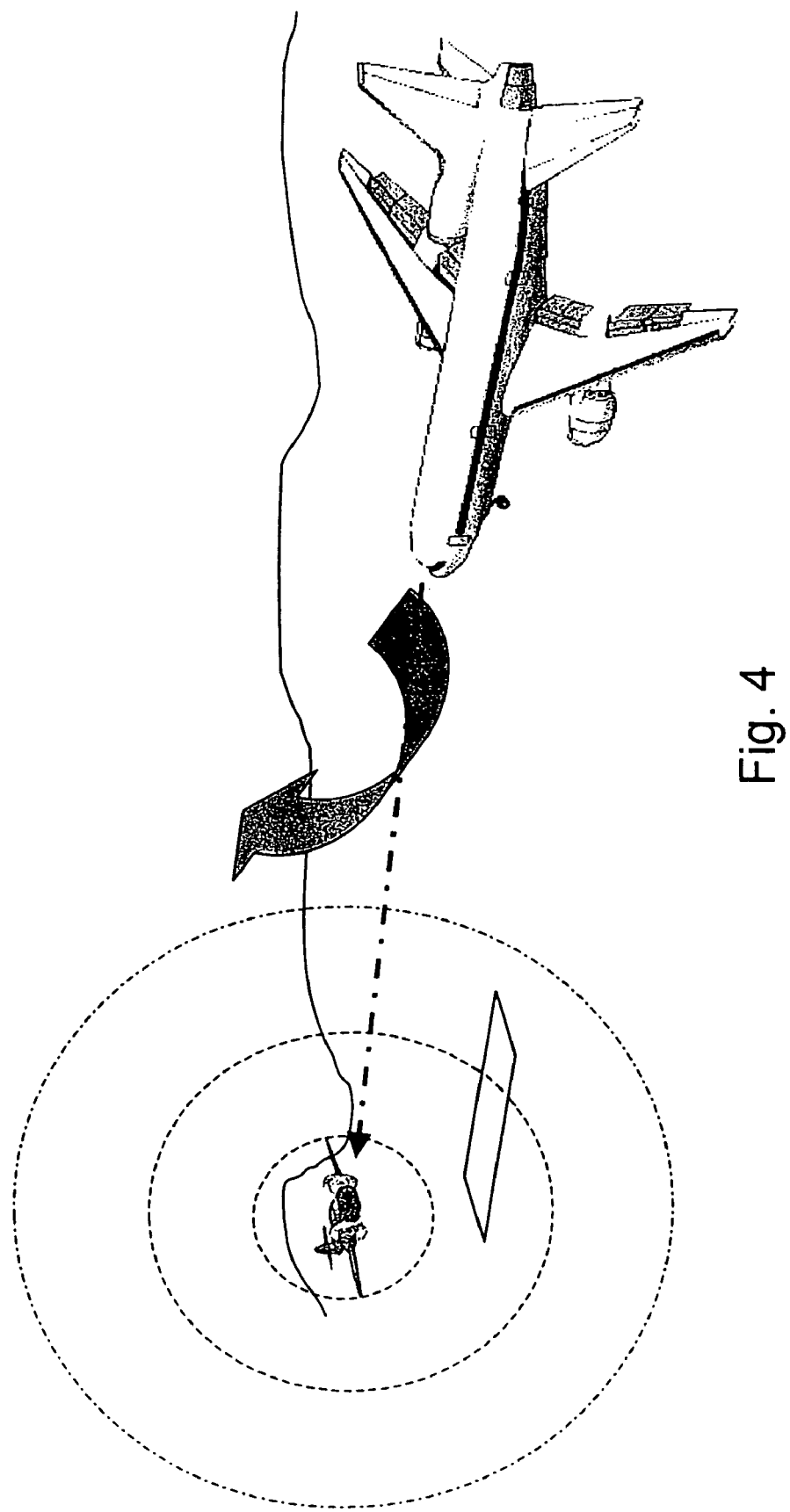
FIGS. 4 through 11 illustrate situations corresponding to various applications of the device according to the invention.

This application aims to help the crew execute the "See and Avoid" procedure, which consists essentially of collision avoidance tasks (FIG. 4). The device according to the invention thus helps the crew visually locate threatening traffic so that no sudden maneuver is necessary in order to avoid a collision. This application is particularly designed for sectors where the information concerning the surrounding traffic comes only from on-board airplane systems (TCAS and ADS-B).

This application is activated automatically when the management device FMS indicates that the airplane is in flight (just after takeoff). It can also be activated manually. On the other hand, this application is inhibited when the airplane is on the ground.

The crew can choose the representation scale on the screen. When the crew chooses to represent planes located at a distance of less than for example 20 NM or 40 NM (Nautical Mile where 1 NM=1,852 m), the filter displays the flight identification number of the corresponding airplane (ref. 14), the position, the heading and the information located in field 16 indicating the relative altitude of the detected plane compared to the ownship and an arrow indicating its vertical movement tendency. FIG. 21 corresponds, for example, to a possible display mode with this application.

For a scale ranging from 21 (or 41) to 120 NM, the filter displays the position, the heading and the information located in the field 16 indicating the relative altitude of the detected plane compared to its ownship and an arrow indicating its vertical movement tendency.

The filtering means provide the automatic display of the information associated with this application must be available with all the TCAS modes. We thus provide here for a superimposition of the TCAS and ADS-B symbols when the two are available. The display priorities are, in order, as follows:

TCAS RA/ADS-B
TCAS TA/ADS-B
ADS-B/TCAS Proximate
TCAS Other
ADS-B (alone).

This application can be activated and operates at the same time as all other applications concerning the airplane when this plane is flight.

Improved Visual Perception of a Same Landing Strip or Visual Approach Support for a Visual Separation Procedure on the Same Landing Strip.

Figure 5:
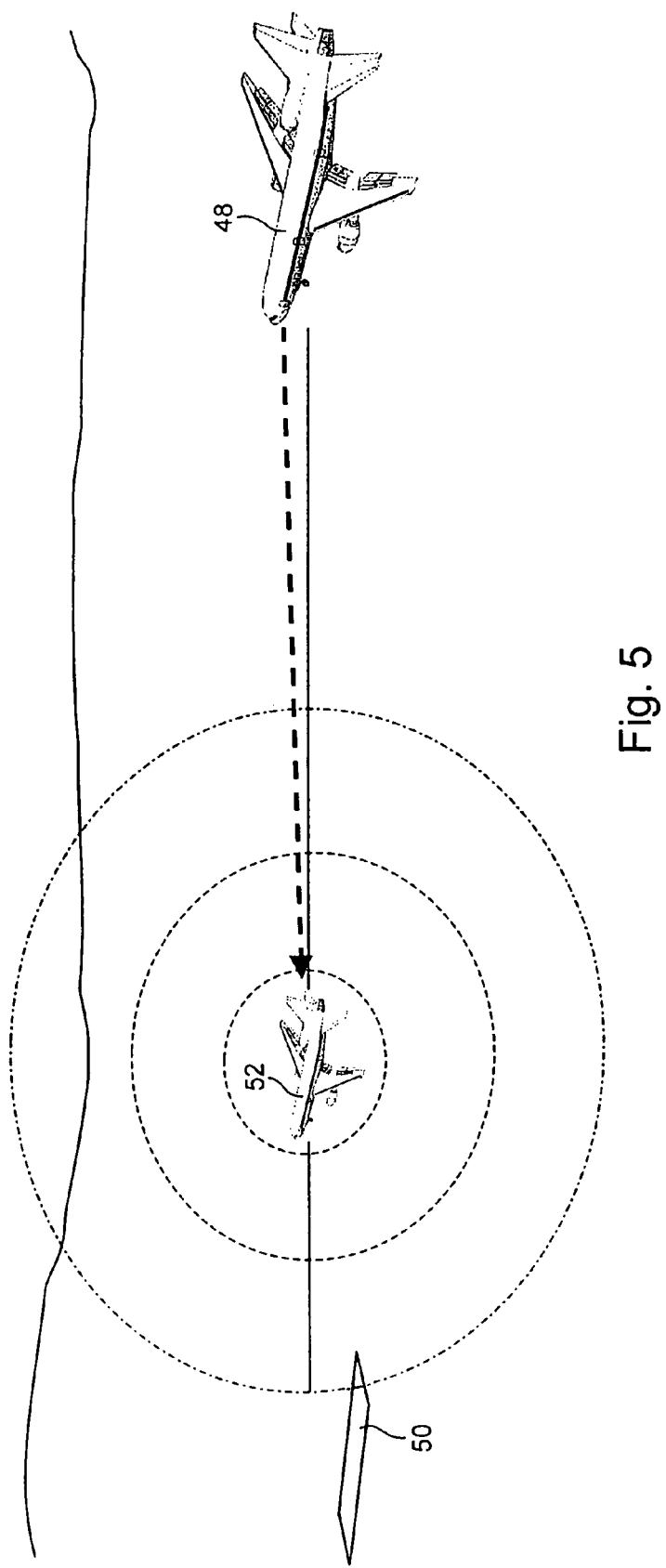

In this case (FIG. 5), the ownship 48 is approaching a landing strip 50, for example, by following another airplane 52. This application is automatically activated upon the IAF (Initial Approach Fix). It seeks to help the crew execute the approach reliably and optimally by using the visual separation clearance with the preceding airplane 52.

We assume here that the FMS knows the flight phase and the configuration of the runways for the airport and the landing strip pre-selected by the crew.

Concerning the filtering, a dynamic volume is connected to the ownship 48. This dynamic volume is, for example, 10 NM long, 4,000 ft high (or around 1,200 m) and 1 NM wide. For any airplane detected in this dynamic volume, the information displayed corresponding to this airplane 52 is: the airplane position, heading, relative altitude and the vertical tendency arrow, the type of airplane, its wake vortex category, the IAS and the graphic indication of the approach rate (obtained from the FAF for Final Approach Fix). FIG. 2J is a display example on the CDTI during this flight phase when this application is used.

We also provide here that the automatic display of the information associated with the application must be available with all the TCAS modes.

This application can also be activated manually through interactive pages like MCDU pages.

Improved Visual Perception of Nearby Landing Strips or Visual Approach Support for a Visual Separation Procedure on Nearby Landing Strips.

The flight management system FMS knows the configuration of the airport it is approaching based on ownship position. The memory of this flight management system FMS is updated regularly to take into account the different modifications occurring at airports throughout the world. Thus, based on the airport and the position of the airplane, the flight management system FMS can indicate whether the present application should be implemented or whether it is necessary to implement the application described previously.

The goal of this application is to help the crew execute the approach to the landing strip 50 using the visual separation clearance with the preceding airplane 52 on parallel 50 and dependent runways. Like the preceding application, this one is activated automatically upon the IAF. The information displayed on the CDTI display unit corresponds, for example, to FIG. 2K. Here for the target airplane 52 we display its plane identifier, its position, its heading, its relative altitude and its vertical tendency arrow, its airplane type, its wake vortex category and the IAS.

Figure 7:
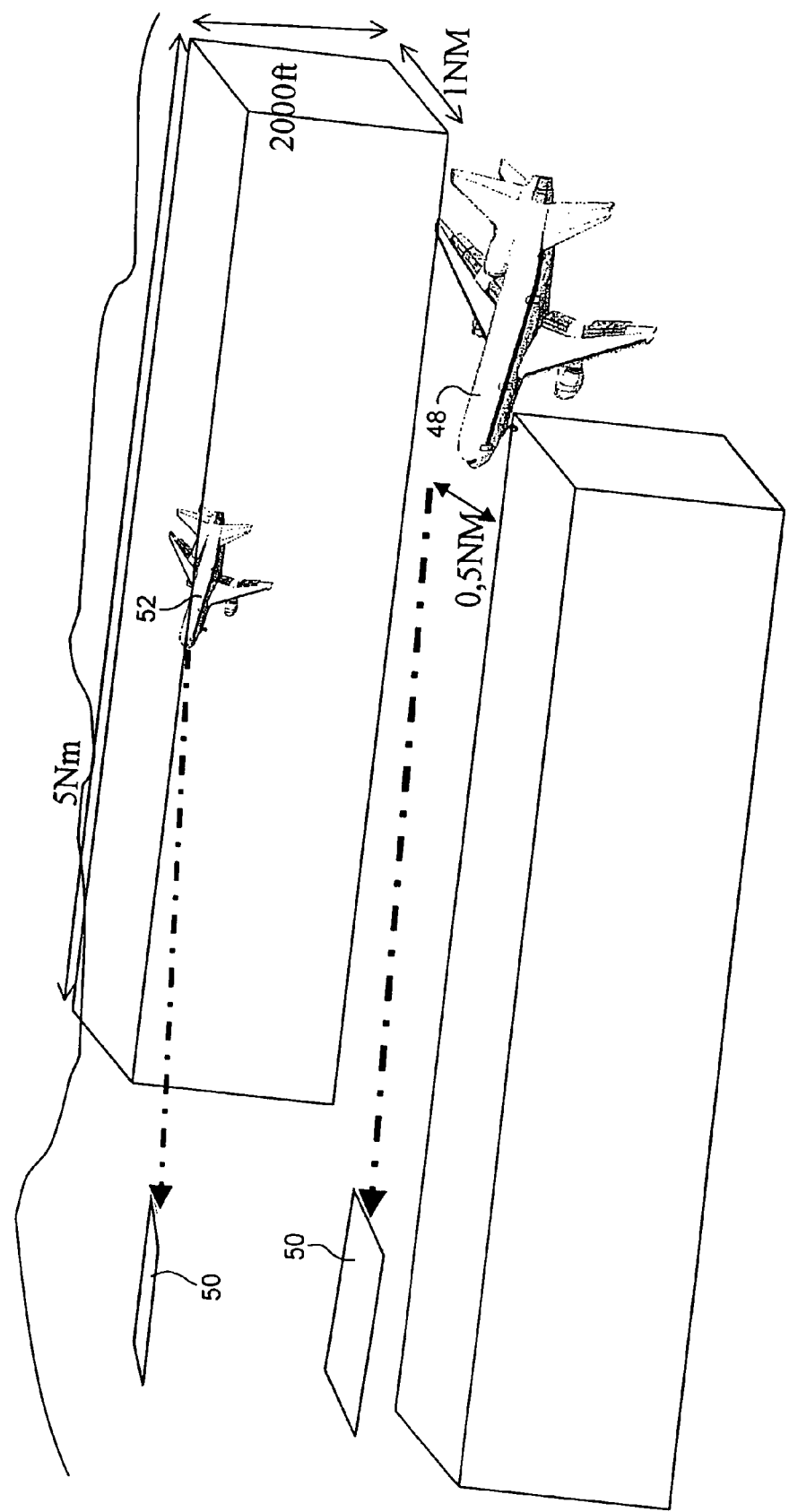

The filtering means provide the automatic display of all additional information in pre-defined dynamic volumes (FIG. 7). These volumes are each positioned on either side of the airplane 48, at a height of 2,000 feet (around 600 m) and a length of 5 NM.

Figure 6:
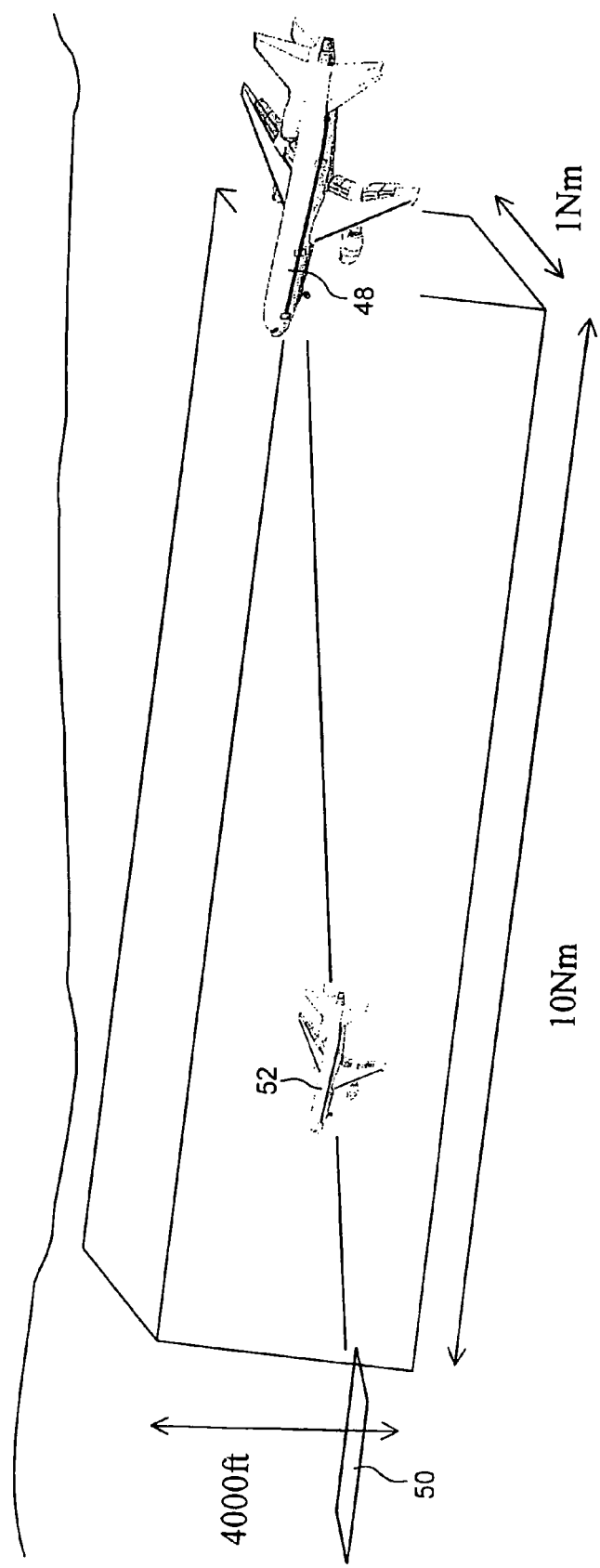

To these two dynamic volumes, we can add, for example, the dynamic volume represented in FIG. 6 used when the second application is implemented.

Here, as well, the automatic display of the information associated with the application must be available with all the TCAS modes.

This application can be activated automatically following the automatic loading of an ATC clearance related to the application and transmitted via CPDLC.

The application can also be activated manually through interactive pages such as MCDU pages.

Improved Transmission of Traffic Information in Uncontrolled Air Spaces—TIBA (Traffic Information Broadcast by Aircraft) Spaces This application makes it possible to situate the surrounding traffic in environments in which there is no ATC (Air Traffic Control) and/or in areas where there is no radar control.

This application is, for example, activated at the request of the crew, for example, by activating an interactive MCDU page. The automatic display of the information associated with the application must be available with all the TCAS modes.

The information displayed comprises the airplane identifier, the position, the heading, the relative altitude, the vertical tendency arrow, the vertical speed and two TCPs (Trajectory Changing Points).

Here, all information coming from the TCAS is displayed.

Representation of Airport Traffic

Figure 8:
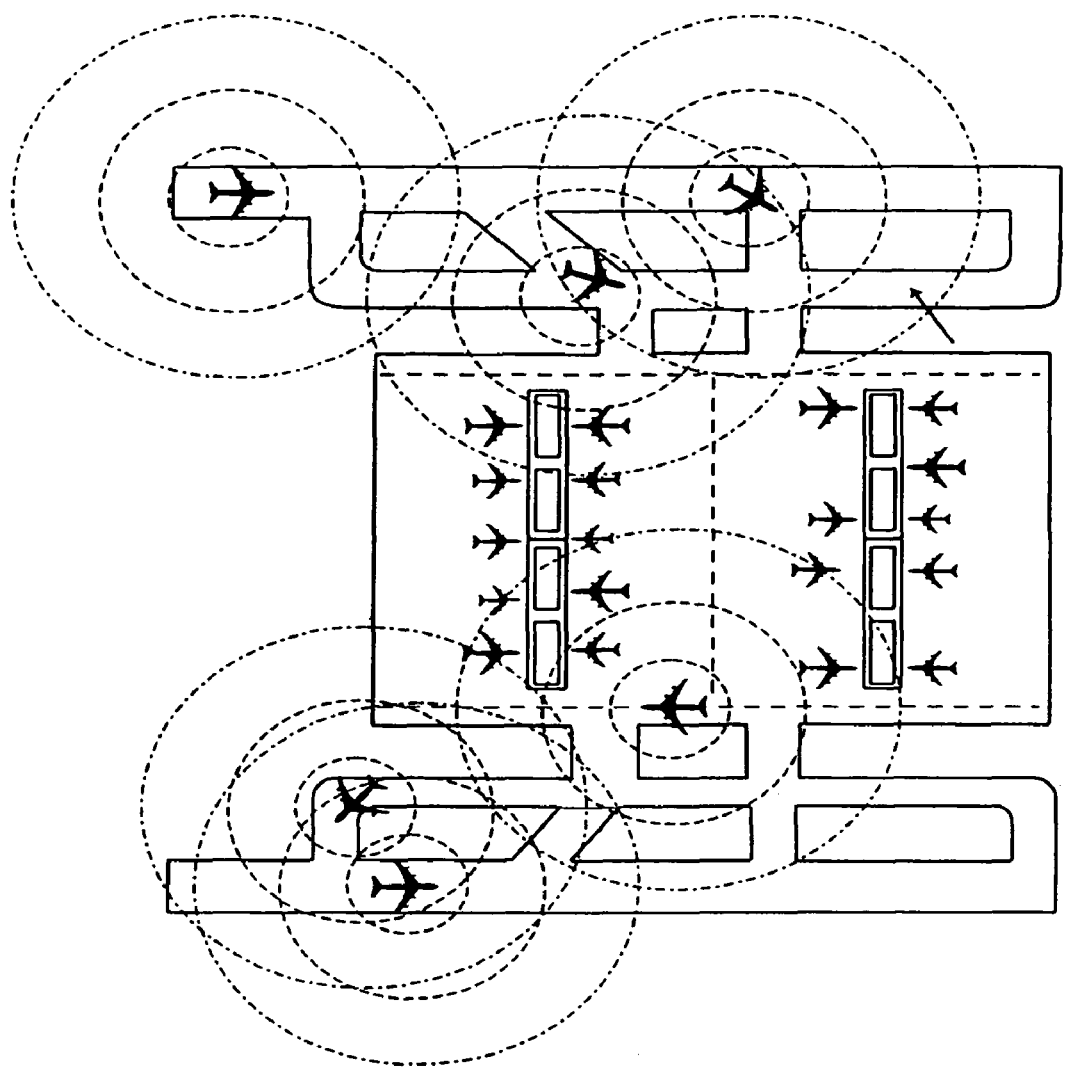

This application aims to avoid collisions and to facilitate ground movements, the objective of this application essentially being safety. It provides the crew with a representation of the status of the traffic in the airport area and must make it possible to improve the safety of airport operations (FIG. 8).

This application is activated by default when the airplane starts up its engines and when, after landing, its speed is less than or equal to 80 knots (or around 150 km/hr). This application is deactivated automatically when the airplane is lined up or when its engines are stopped.

In this application, three display zoom levels are offered to the crew on the CDTI.

For the smallest scale, allowing the representation of the space located 0.5 NM around the airplane, the display indicates the airplane identifier, the position, the type of airplane, the heading and the speed vector.

When the scale selected allows the representation of a space 1 NM around the airplane, the information displayed comprises the position, the heading and the speed vector.

For a larger scale in which the entire airport can be represented (for example 5 NM), only the position, that is, the symbol representing the airplanes, is displayed.

This application can also be activated manually through interactive MCDU pages.

Detection of the Occupation Status of Runways for Takeoff and Landing.

This application seeks to increase the safety of runway operations. The goal is to avoid runway incursion and collisions by giving the crew sufficient information concerning the surrounding traffic.

A display example on the CDTI is given by FIG. 2L. This application is activated when a moving body is detected on the runway. It may be an airplane, of course, but also another vehicle moving on the airport runways. If this body is an airplane, the information displayed is: the airplane identifier, the position, the type of airplane, the type of airplane, the heading, the relative altitude if the airplane detected is flying, the vertical tendency arrow and the speed vector.

In this application, not only airplanes but also the airport runways are represented, as well as possible objects on these runways.

The filtering algorithms can be summarized by the tables below depending on the phase in which the airplane is situated: taxiing phase, takeoff phase or final phase and landing.

Taxiing Phase

| Position of ownship | 0 m < D < 50 m | 50 < D < 200 m | D < 200 m |
|---|---|---|---|
| No other moving bodies | Runway in gray | Runway in gray | Runway in gray |
| Airplane in final D < 2 NM or a moving body on the runway with a ground speed > 80 knots in direction of ownship | Runway in red | Runway in amber | Runway in gray |
| Other configurations | Runway in gray | Runway in gray | Runway in gray |

Takeoff Phase

| Position of ownship | 0 m < D < 50 m |
|---|---|
| No other moving bodies | Runway in gray |
| If there is a moving body on the runway in front of ownship If moving body is moving at a ground speed > 80 knots In direction of ownship | Runway in red |
| Other configurations | Runway in gray |

When the airplane is in the air, the runway resumes its nominal appearance.

Final Phase and Landing

| Position of ownship | 1 NM < Final < 2 NM | Final < 1 NM and Landing (GS > 80 knots) |
|---|---|---|
| No other moving bodies | Runway in gray | Runway in gray |
| If there is a moving body at a distance: threshold < D < 2500 m | Runway in amber | Runway in red |
| If the moving body is situated in front of ownship at a distance: threshold < D < 2500 m with a $\Delta GS/\Delta D < 5, 10-3$ | | |
| If the moving body is situated in front of ownship at a distance: threshold < D < 2500 m with a $\Delta GS/\Delta D < 0.005$ | Runway in amber | Runway in amber |
| Other configurations | Runway in gray | Runway in gray |

Improved Representation of Traffic During Takeoff or Support for Visual Separation During Successive Takeoffs.

Figure 9:
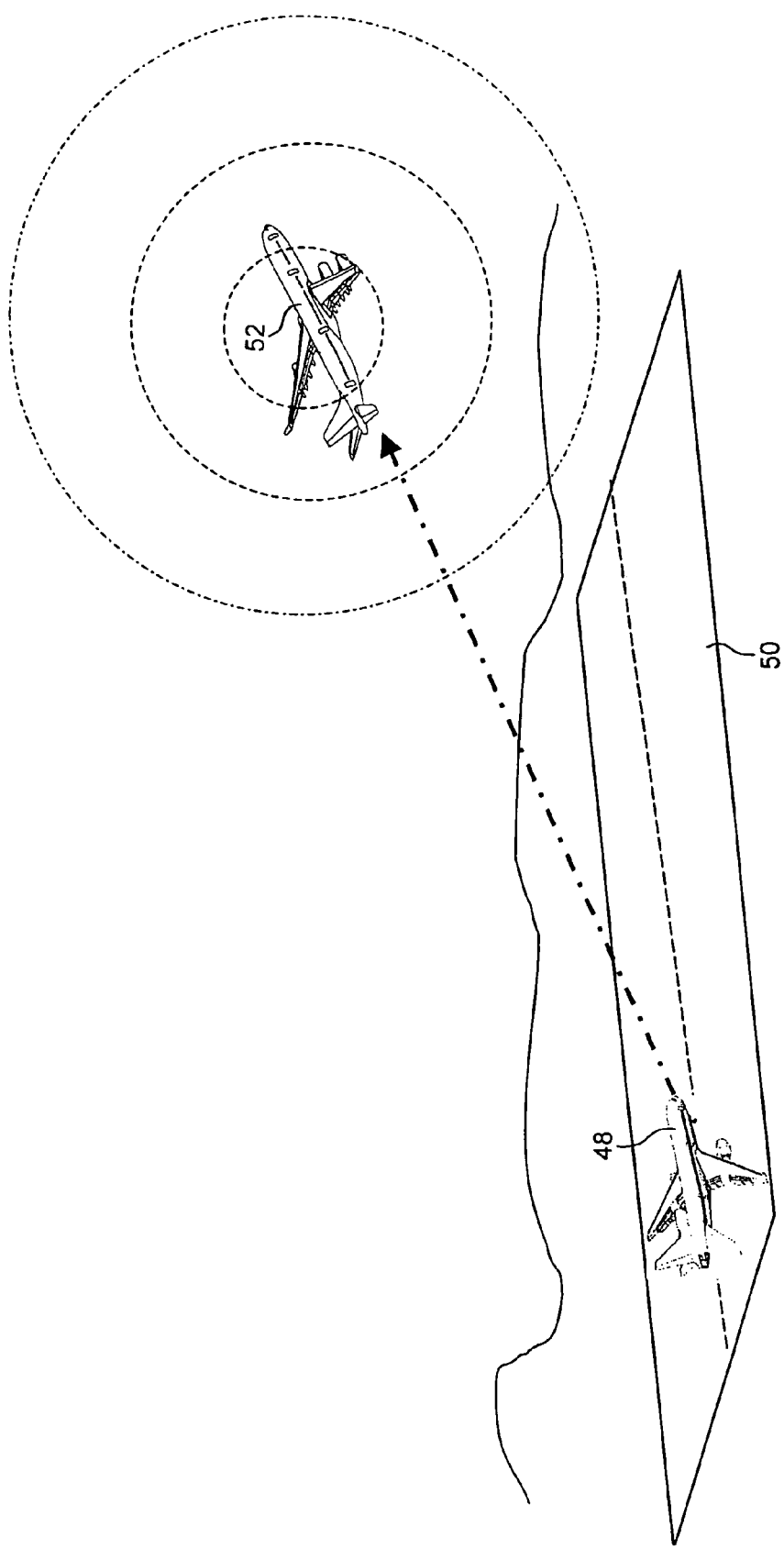

This application aims to increase the frequency of the visual separation clearances for takeoff operations. The goal is the visual acquisition of traffic, as well as increased safety for this type of operation by supplying the information and the identification of the airplanes (FIG. 9).

This application is activated manually. The automatic display of the information associated with the application must be available with all the TCAS modes.

In this application, the information is displayed only for a selected airplane with the interface 4 (or other selection means). This information comprises the airplane identifier, the position, the heading, the relative altitude, the vertical tendency arrow, the type of airplane, the vortex category, the IAS (Indicated Air Speed), the approach rate and a chronometer displayed at the bottom right of the CDTI screen. A display example is given in FIG. 2M.

Emergency Situation

This application allows the display of airplanes in emergency status. The crew is then able to change trajectory quickly and therefore facilitate the safety maneuvers of airplanes in distress.

This application is armed by default. It is activated automatically when traffic transmits its distress status in an ADS-B report. It can also be activated manually.

An example of the information displayed is given in FIG. 2N. The information displayed is then the EMERG message in red, the airplane identifier (if the traffic is situated less than 20 or 40 NM away) the position, the heading, the vertical tendency arrow, the relative altitude and the vertical speed.

Filtering is performed according to the following principles. If the ownship is not in an emergency situation, the traffic in emergency situation is displayed according to the scale selected in the ABOVE mode. If, on the other hand, the ownship is in an emergency situation, the traffic is displayed in the 9,000 feet volume below the airplane.

Prediction and Anticipation of Flight Operations.

Figure 10:
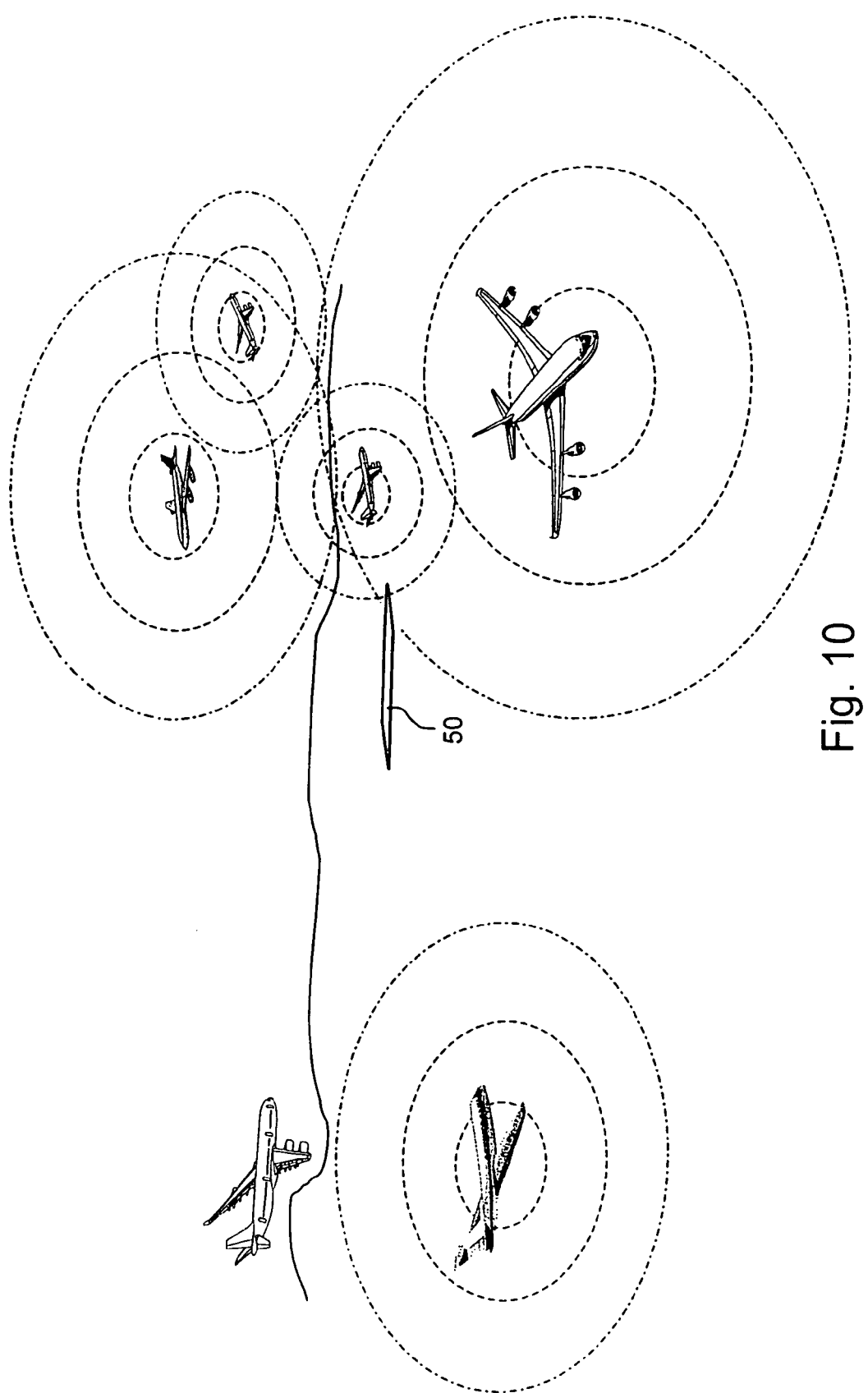

This application aims to allow better comprehension of the surrounding situation for the crew (FIG. 10). The crew is then capable of better planning its flight operations. This application leads to increased flight efficiency and improved passenger comfort.

This application is activated at the crew's request. The information displayed corresponds to the TCP (Trajectory Changing Points) if they are available from the ADS-B system, as well as the IAS (Indicated Air Speed) or even the Mach number.

The additional information available can be displayed by request of the crew in the interface 4 or on the MDCU. We then have, for example, a display corresponding to the display represented in FIG. 2P.

The display of the information associated with this application must be available with all the TCAS modes.

Wake Vortex Avoidance.

Figure 11:
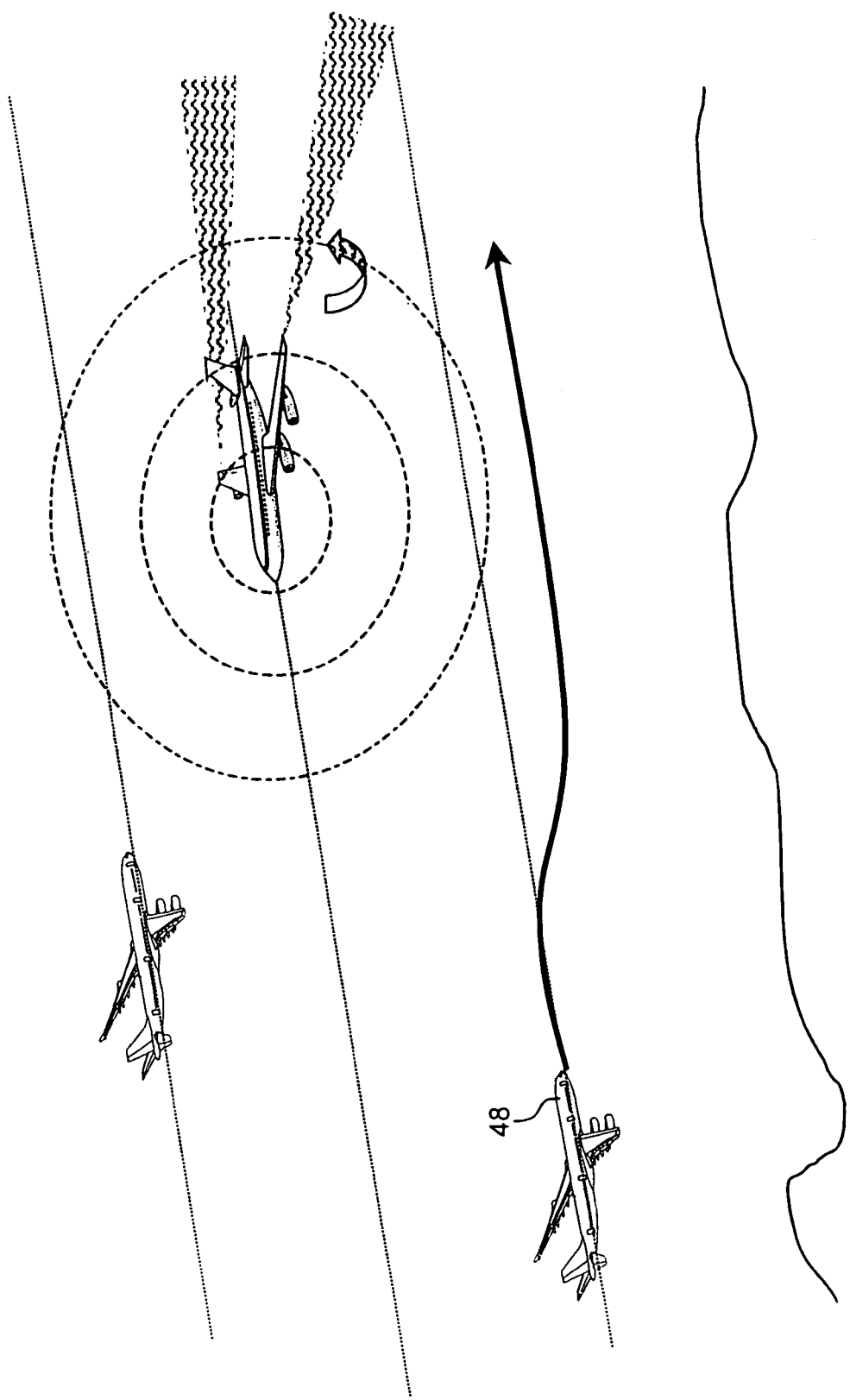

This application aims to inform crews of potential wake vortex risks. Thanks to this application, the crew is able to change the trajectory to avoid this turbulence. This situation is illustrated in FIG. 11. Thus, the airplane 48 can modify its trajectory as symbolized by an arrow to avoid the turbulence represented symbolically in this figure.

This application is activated by default. When it is activated, the display indicates in what wake vortex category the planes represented are situated.

Planes that are very far away from this airplane do not risk disturbing its flight. Likewise, planes located behind it cannot present a problem. We then use filtering in which a semicircle with a thickness of 4000 feet (around 1200 m) centered on the airplane and whose radius depends on the relative speed of the two airplanes is defined. Information concerning turbulence will be mentioned for planes located in this dynamic space connected to the system's ownship. We can, for example, select a semi-circle with a radius of 6 NM if the approach speed is less than 50 knots or, for example a radius of 20 HM if the approach speed is greater than 400 knots. An intermediate radius of 12 NM can also be selected when the approach speed is between 50 and 400 knots.

Summary of Applications

The filtering installed can be summarized using the following table:

| Applications | Taxiing | Takeoff | Ascent/ Cruising | Approach | Landing |
|---|---|---|---|---|---|
| Airport traffic report | X | | | | X |
| Occupation of runways | X | X | | | X |
| Takeoff traffic report | | X | | | |
| In-flight collision avoidance | | X | X | X | X |
| Flight operations prediction | | | X | X | |
| Trans. info on the traffic | | | X | X | |
| Vis. perception of the same runway | | | | X | |
| Vis. perception on nearby runways | | | | X | |
| Emerg. sit. | | X | X | X | X |
| Turb. avoidance | | X | X | X | X |

We note in this table the applications that can be implemented depending on the flight phases of the airplane. Several applications can operate at the same time.

Thanks to the ten applications that can be implemented, the device described above makes it possible to represent the traffic situation for the pilot through the CDTI display device equipping the airplane. We can, of course, provide another specific display unit dedicated to the device according to this invention.

The description above and the attached drawing offer a representation of the traffic identified by an ADS-B system and/or a TISB system correlated and integrated with the ACAS (Airborne Collision Avoidance System) through an entirely new symbology that is consistent with the incursion logic of the TCAS. This new display device also allows the display of information necessary for managing the different flight operations. The filtering algorithms allow in particular automatic display logics for the information that is to appear on the screen. The device according to the invention also allows interaction between the crew and the information supplied.

The information concerning the surrounding traffic is, depending on the applications, activated automatically and is consistent with the flight phase and the crew's associated tasks. These applications can also be activated automatically following a clearance given by air traffic control for the execution of various phases of a flight plan. Certain applications, as described above, can be activated through pages of the device known as the MCDU or by dedicated commands.

This invention is not limited to the forms of embodiment described above by way of non-limiting examples. It also concerns all embodiment variants within the grasp of the person with ordinary skill in the art within the framework of the claims hereinbelow.

What is claimed as new and desired to be secured by Letters Patent of the United States is:

1. An aircraft cockpit display device for information concerning surrounding traffic comprising:
   a receiver configured to receive information coming from outside the aircraft,
   a storage unit configured to store the flight parameters of the aircraft,
   a calculator configured to calculate the relative speeds and positions of the aircraft and of an aircraft detected in the immediate vicinity, and
   a display controller configured to control a display unit configured to display a representation of the surrounding traffic through symbols and potential messages based on the instructions received by the display controller,
   wherein the display controller is connected to an on-board calculator in order to receive the flight phase of the aircraft,
   the display controller includes a filter defining, for each flight phase and/or crew task, the nature and the level of information to be supplied to the display unit,
   the filter includes a determining unit configured to determine whether or not two distinct bits of information coming from distinct information sources correspond to a same detected aircraft,
   based on the flight phase, a predetermined symbol stored in a memory associated with the display unit is displayed by the display unit to represent a landing strip, and
   based on the flight phases, the symbol used to represent a detected aircraft is associated with an arrow or figure whose length is representative of the approach rate of said aircraft compared to the ownship.

2. The display device as claimed in claim 1, wherein the display controller also includes a modifying unit configured to modify the display based on particular information of a pre-determined type received by the receiver.

3. The display device as claimed in claim 1, wherein the display controller is connected to a communication unit configured to communicate with a crew member.

4. The display device as claimed in claim 3, wherein the communication unit includes a control keyboard.

5. The display device as claimed in claim 1, wherein the display controller includes an adjusting unit configured to adjust a scale used for the display unit.

6. The display device as claimed in claim 3, wherein the communication unit includes a manual selector for selecting a symbol displayed on the display unit.

7. The display device as claimed in claim 1, wherein the color of the symbol displayed corresponding to a landing strip varies based on whether or not another aircraft is present on said landing strip as well as based on the risks involved for the aircraft to use said landing strip based on predetermined criteria stored in a memory associated with the display controller.

8. The aircraft cockpit display device as claimed in claim 1, wherein the display unit is configured to display pre-defined symbols saved in a memory associated with the display unit to represent a detected aircraft, as well as information in alphanumerical form alongside at least one symbol displayed by the display unit.

9. The display device as claimed in claim 8, wherein the information in alphanumeric form provided alongside a symbol corresponding to a detected aircraft is a function of the flight phase and/or of the distance separating the detected aircraft from the ownship and/or of the speed of the detected aircraft and/or the orbital direction of this aircraft.

10. The display device as claimed in claim 1, wherein the ownship is symbolized on the display unit.

11. The display device as claimed in claim 10, wherein a specific color is used to represent the ownship.

12. An aircraft cockpit display device for information concerning surrounding traffic comprising:
   a receiver configured to receive information coming from outside the aircraft,
   a flight parameter unit configured to determine the flight parameters of the aircraft,
   a calculation unit configured to calculate the relative speeds and positions of the aircraft and of an aircraft detected in the immediate vicinity,
   a display controller configured to control a display to display a representation of the surrounding traffic through symbols and potential messages based on the instructions received by the display controller,
   a recognition unit configured to recognize a source of information received from the outside, and
   wherein the display is configured to display a different aircraft representation symbol depending on the source of information used to detect said aircraft, said symbol being stored in a memory associated with the display,
   the display controller is connected to an on-board calculator in order to receive the flight phase of the aircraft,
   the display controller has a filter defining, for each flight phase and/or crew task, the nature and the level of information to be supplied to the display,
   the display is configured to display a single symbol representative of an aircraft corresponding to the superimposition of two symbols when the information used to detect an aircraft comes from two different and consistent sources, said aircraft symbol corresponding to the integration of the symbols corresponding to the sources concerned, and
   based on the flight phases, the symbol used to represent a detected aircraft is associated with an arrow or figure whose length is representative of the approach rate of said aircraft compared to the ownship.

13. The display device as claimed in claim 12, wherein the receiver comprises a TCAS and the symbol of an aircraft detected by the TCAS is represented in the form of a lozenge or a circle or a square.

14. The display device as claimed in claim 13, wherein the lozenge is white, the circle is orange and the square is red.

15. The display device as claimed in claim 12, wherein the receiver comprises an ADS-B system and the symbol of an aircraft detected by the ADS-B system takes the form of a longitudinal bar symbolizing the fuselage of the detected aircraft, a large transversal bar symbolizing its wings and a small transversal bar symbolizing its tail assembly.

16. The display device as claimed in claim 15, wherein the longitudinal bar of the symbol representing the aircraft detected is oriented so that it indicates the relative direction of movement of this aircraft compared to its ownship while the relative position of the transversal bars gives the orbital direction.

17. The display device as claimed in claim 12, wherein the receiver comprises a TIS-B system and the symbol of an aircraft detected by the TIS-B system takes the form of a longitudinal bar symbolizing the fuselage of the aircraft detected and a V centered on the bars symbolizing the fuselage and the wings of the aircraft.

18. The display device as claimed in claim 17, wherein the longitudinal bar of the symbol representing the detected aircraft and the V are oriented so as to indicate the relative orbital direction of the detected aircraft compared to its own aircraft.

19. The display device as claimed in claim 12, wherein the receiver comprises an ADS-B system and a TCAS and the symbol for representing an aircraft detected both by the ADS-B and the TCAS systems takes the form of a longitudinal bar symbolizing the fuselage of the aircraft detected, a large transversal bar symbolizing its wings and a small transversal bar symbolizing its tail assembly superimposed on the representation symbol provided by the TCAS, namely a lozenge, circle or square, this symbol being located at the intersection of the bar representing the fuselage and the bar representing the wings.

20. The display device as claimed in claim 12, wherein the receiver comprises a TIS-B system as well as a TCAS and the symbol for representing an aircraft detected both by the TIS-B system and the TCAS takes the form of a longitudinal bar symbolizing the fuselage of the aircraft detected, a V centered on the bar symbolizing the fuselage and symbolizing the wings of the aircraft and a small transversal bar symbolizing its tail assembly superimposed on the representation symbol provided by the TCAS, namely the lozenge, circle or square, this symbol being located at the intersection of the bar representing the fuselage and the bar representing the wings.

21. The display device as claimed in claim 12, wherein the receiver comprises an ADS-B system and a TIS-B system, as well as a TCAS and the symbol for representing an aircraft detected both by the ADS-B and TIS-B systems and by the TCAS takes the form of a longitudinal bar symbolizing the fuselage of the aircraft detected, a large transversal bar symbolizing its wings and a small bar symbolizing its tail assembly superimposed on the representation symbol provided by the TCAS, namely the lozenge, circle or square, this symbol being located at the intersection of the bar representing the fuselage and the bar representing the wings.

22. An aircraft cockpit display device for information concerning surrounding traffic comprising:
a receiver configured to receive information coming from outside the aircraft,
a flight parameter unit configured to determine the flight parameters of the aircraft,
a calculation unit configured to calculate the relative speeds and positions of the aircraft and of an aircraft detected in the immediate vicinity,
a display controller configured to control a display to display a representation of the surrounding traffic through symbols and potential messages based on the instructions received by the display controller,
wherein the display controller is connected to an on-board calculator in order to receive the flight phase of the aircraft,
the display controller has a filter defining, for each flight phase and/or crew task, the nature and the level of information to be supplied to the display, and
based on the flight phases, the symbol used to represent a detected aircraft is associated with an arrow or figure whose length is representative of the approach rate of said aircraft compared to the ownship.

23. An aircraft cockpit display device for information concerning surrounding traffic comprising:
a receiver configured to receive information coming from outside the aircraft,
a storage unit configured to store the flight parameters of the aircraft,
a calculator configured to calculate the relative speeds and positions of the aircraft and of an aircraft detected in the immediate vicinity, and
a display controller and display unit configured to display a representation of the surrounding traffic through symbols and potential messages based on the instructions received by the display controller,
wherein the display controller is connected to an on-board calculator in order to receive the flight phase of the aircraft,
the display controller includes a filter defining, for each flight phase and/or crew task, the nature and the level of information to be supplied to the display unit, and
the flight phases are provided by the on-board calculator and include at least: flight preparation, takeoff, ascent, cruising speed, descent, approach, overshoot, and end of flight, and
based on the flight phases, the symbol used to represent a detected aircraft is associated with an arrow or figure whose length is representative of the approach rate of said aircraft compared to the ownship.

24. The display device as claimed in claim 23, wherein the display controller includes a modifying unit configured to modify the display based on particular information of a predetermined type received by the receiver.

25. The display device as claimed in claim 23, wherein the display command controller is connected to a communicating unit configured to communicate with a crew member.

26. The display device as claimed in claim 25, wherein the communication unit includes a control keyboard.

27. The display device as claimed in claim 23, wherein the display controller includes an adjustment unit configured to adjust a scale used for the display unit.

28. The display device as claimed in claim 25, wherein the communication unit includes a manual selector for selecting a symbol displayed on the display unit.

29. The display device as claimed in claim 23, wherein the filter includes a determining unit configured to determine whether or not two distinct bits of information coming from distinct information sources correspond to a same detected aircraft.

30. The display device as claimed in claim 23, further comprising:
a determining unit configured to determine a source of information received from the outside, and
wherein the display unit is configured to display a different aircraft representation symbol depending on the source of information used to detect said aircraft, said symbol being stored in a memory associated with the display unit.

31. The display device as claimed in claim 30, wherein the receiver includes a TCAS and the symbol of an aircraft detected by the TCAS is represented in the form of a lozenge or a circle or a square.

32. The display device as claimed in claim 31, wherein the lozenge is white, the circle is orange and the square is red.

33. The display device as claimed in claim 30, wherein the receiver includes an ADS-B system and the symbol of an aircraft detected by the ADS-B system takes the form of a longitudinal bar symbolizing the fuselage of the detected aircraft, a large transversal bar symbolizing its wings and a small transversal bar symbolizing its tail assembly.

34. The display device as claimed in claim 33, wherein the longitudinal bar of the symbol representing the aircraft detected is oriented so that it indicates the relative direction of movement of this aircraft compared to its ownship while the relative position of the transversal bars gives the orbital direction.

35. The display device as claimed in claim 30, wherein the receiver includes a TIS-B system and the symbol of an aircraft detected by the TIS-B system takes the form of a longitudinal bar symbolizing the fuselage of the aircraft detected and a V centered on the bars symbolizing the fuselage and the wings of the aircraft.

36. The display device as claimed in claim 35, wherein the longitudinal bar of the symbol representing the detected aircraft and the V are oriented so as to indicate the relative orbital direction of the detected aircraft compared to its own aircraft.

37. The display device as claimed in claim 30, wherein the display unit is configured to display displays a single symbol representative of an aircraft corresponding to the superimposition of two symbols when the information used to detect an aircraft comes from two different and consistent sources, said aircraft symbol corresponding to the integration of the symbols corresponding to the sources concerned.

38. The display device as claimed in claim 37, wherein the receiver includes an ADS-B system and a TCAS and the symbol for representing an aircraft detected both by the ADS-B and the TCAS systems takes the form of a longitudinal bar symbolizing the fuselage of the aircraft detected, a large transversal bar symbolizing its wings and a small transversal bar symbolizing its tail assembly superimposed on the representation symbol provided by the TCAS, namely a lozenge, circle or square, this symbol being located at the intersection of the bar representing the fuselage and the bar representing the wings.

39. The display device as claimed in claim 37, wherein the receiver includes a TIS-B system as well as a TCAS and the symbol for representing an aircraft detected both by the TIS-B system and the TCAS takes the form of a longitudinal bar symbolizing the fuselage of the aircraft detected, a V centered on the bar symbolizing the fuselage and symbolizing the wings of the aircraft and a small transversal bar symbolizing its tail assembly superimposed on the representation symbol provided by the TCAS, namely the lozenge, circle or square, this symbol being located at the intersection of the bar representing the fuselage and the bar representing the wings.

40. The display device as claimed in claim 37, wherein the receiver includes an ADS-B system and a TIS-B system, as well as a TCAS and the symbol for representing an aircraft detected both by the ADS-B and TIS-B systems and by the TCAS takes the form of a longitudinal bar symbolizing the fuselage of the aircraft detected, a large transversal bar symbolizing its wings and a small bar symbolizing its tail assembly superimposed on the representation symbol provided by the TCAS, namely the lozenge, circle or square, this symbol being located at the intersection of the bar representing the fuselage and the bar representing the wings.

41. The display device as claimed in claim 23, wherein based on the flight phases, the symbol used to represent a detected aircraft is potentially associated with an arrow or figure whose length is representative of the approach rate of said aircraft compared to the ownship.

42. The display device as claimed in claim 23, wherein based on the flight phases, a predetermined symbol stored in a memory associated with the display unit is displayed by the display unit to represent a landing strip.

43. The display device as claimed in claim 42, wherein the color of the symbol displayed corresponding to a landing strip varies based on whether or not another aircraft is present on said landing strip as well as based on the risks involved for the aircraft to use said landing strip based on predetermined criteria stored in a memory associated with the display controller.

44. The display device as claimed in claim 23, wherein the display unit is configured to display pre-defined symbols saved in a memory associated with the display unit to represent a detected aircraft, as well as information in alphanumerical form alongside at least one symbol displayed by the display unit.

45. The display device as claimed in claim 44, wherein the information in alphanumeric form provided alongside a symbol corresponding to a detected aircraft is a function of the flight phase and/or of the distance separating the detected aircraft from the ownship and/or of the speed of the detected aircraft and/or the orbital direction of this aircraft.

46. The display device as claimed in claim 23, wherein the ownship is symbolized on the display unit.

47. The display device as claimed in claim 46, wherein a specific color is used to represent the ownship.

* * * * *